Figure 1:
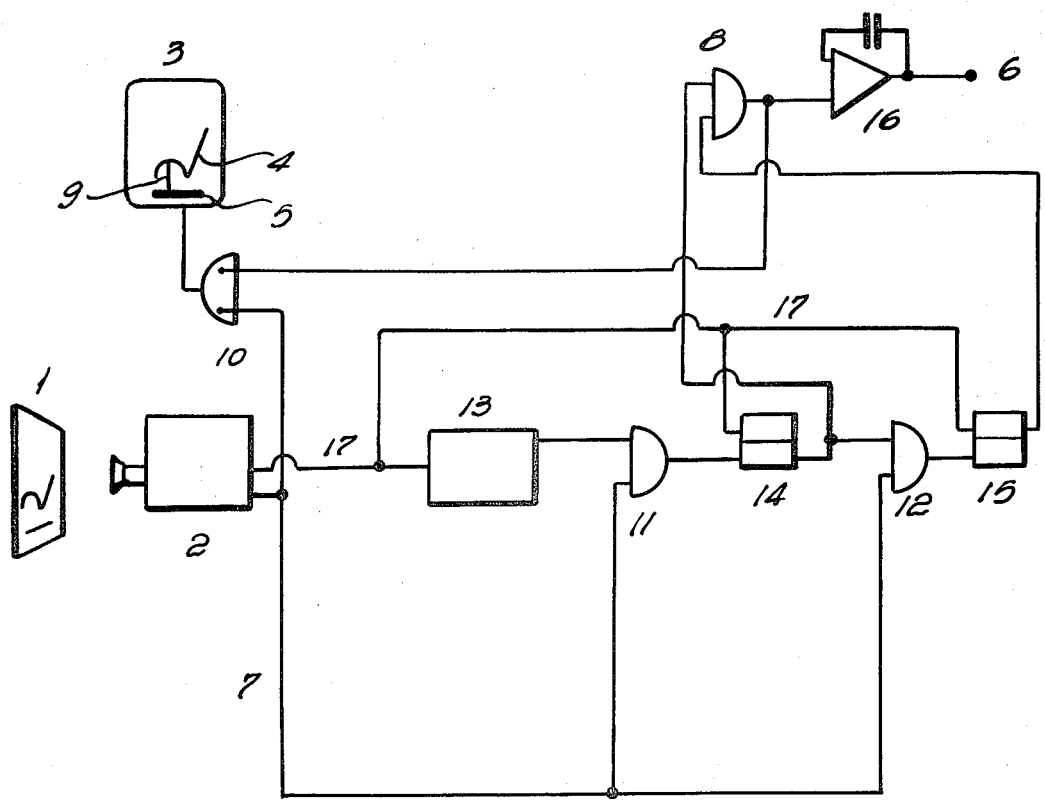

United States Patent [19]
von Reichenbach

[11] 3,719,777
[45] March 6, 1973

[54] PROCESS AND APPARATUS FOR CONVERTING IMAGE ELEMENTS TO ELECTRIC IMPULSES

[75] Inventor: Fernando von Reichenbach, City Bell, Argentina

[73] Assignee: Instituto Torcuato di Tella, Capital Federal, Argentina

[22] Filed: April 19, 1971

[21] Appl. No.: 135,006

[30] Foreign Application Priority Data

April 17, 1970  Argentina..............................228168

[52] U.S. Cl.........178/6.8, 178/DIG. 1, 178/DIG. 22, 178/DIG. 36, 235/61.6 A, 235/61.6 B
[51] Int. Cl........G06k 9/12, G06k 11/02, H04n 7/18
[58] Field of Search.....178/DIG. 1, DIG. 4, DIG. 22, 178/DIG. 36; 235/61.6 A, 61.6 B

[56] References Cited

UNITED STATES PATENTS 3,337,684  8/1967  Sadler..............................178/DIG. 4
3,388,377  6/1968  Folsom et al......................178/6.8 X
3,364,382  1/1968  Harrison..........................178/6.8 X

OTHER PUBLICATIONS

"A New Method of Television Waveform Display" By Glen Southworth Journal of the SMPTE September 1966 pp 848–850

Primary Examiner—Howard W. Britton
Attorney—Tab T. Thein

[57] ABSTRACT

Process and apparatus by which numerical values or image elements represented in graph form on paper or other similar material are converted into electric impulses. In a preliminary stage, the graphic numerical values can be successively analyzed and modified, readjusting them to the requirements of the case, in relation to the electric impulses they generate. The graphic numerical values are converted into variable electrical voltages in order to program processes controlled by voltage or intensity, but they can also be utilized in the programming of processes controlled by pulses of variable duration or by counting the pulses.

2 Claims, 2 Drawing Figures

INVENTOR
Fernando von Reichenbach
BY
Agent

INVENTOR
Fernando von Reichenbach
BY
Agent

PROCESS AND APPARATUS FOR CONVERTING IMAGE ELEMENTS TO ELECTRIC IMPULSES

The invention relates to a programming system, embodied in a process and two exemplary embodiments of an apparatus, corrigible through a closed-circuit television camera, and is destined to the study and operation of processes controlled by electric impulses.

For the new corrigible programming system of the invention a closed-circuit TV camera is used without modifications. The graphic numerical values take the shape of one or more curves, each formed by successive points or image elements, which follow the distance of each curve up to their respective axes of abscissae and which represent the numerical values point by point, that will be converted into correlating electric impulses in an analogous form.

The graphic representation can then be explored point by point or by scanning at a uniform or variable speed. In the latter case the variations in each section of the explored curve may be regulated by a complementary curve, also represented on the graph, which corresponds with the explored curve.

A digital circuit takes the information furnished by the video signal delivered by the camera, converting it directly into control signals. Normally the camera explores the entire graph at a rate of 50 frames per second. The graph is placed before the closed-circuit TV camera in such a way that its axis of ordinates is parallel to the horizontal exploring lines.

A system of known electronic gates is used to select from each frame one of these lines, or several adjacent lines. This selection consists in the exploration of the graph since, even though on a monitor screen the whole frame can be seen as the camera transmits it, the points of the curve (and of its abscissa axis) that are being explored will appear more brilliant. Because of this the exploration can be followed visually.

When the electric impulse, obtained as a result of the conversion of a numerical value represented by a given point on the curve, is not the right one, such impulse can be modified by way of a corresponding modification of the curve. This operation is very simple; when for example a curve has been drawn with pencil on a piece of paper, any section of the curve can be erased or drawn again correctly.

The new corrigible programming system according to the invention has many applications but more intensive experiments have been made with optimum results in the field of music synthesizers (laboratories). The new devices of this kind, known under the names of Moog and Buchla-type synthesizers, are voltage controlled. Employing the present invention, the functioning of these instruments will be as follows:

Generators: One curve controls the frequency and another the amplitude of the signal. It is possible to activate several generators at the same time. Examples: a horizontal straight line produces a determined frequency whose pitch depends on its distance from the abscissa axis or reference line. An inclined line however produces a glissando. If the line is drawn free-hand, aleatoric fluctuations are produced, subject to a certain degree of control, which are similar to those produced by a performer on a traditional instrument, e.g., a violin.

Filters: Similarly, the form and width of the spectrum (substractive synthesis) are controlled and also the variation in relation to time. For example: band-pass tremolos and vibratos in controlled form and in perfect synchronization with the other voices.

Modulation: The invention allows the control of dynamic envelopes, the production of very complex attacks and decays, all this with exact synchronism. By allowing partial expansion of the time scale (using another curve which determines the speed of exploration) it greatly reduces the length of the sheet of paper or draft score. The latter bears a strong resemblance to one of the electronic music scores of Stockhausen and also carries indications necessary for the automatic connection of the required circuits.

Figure 2:
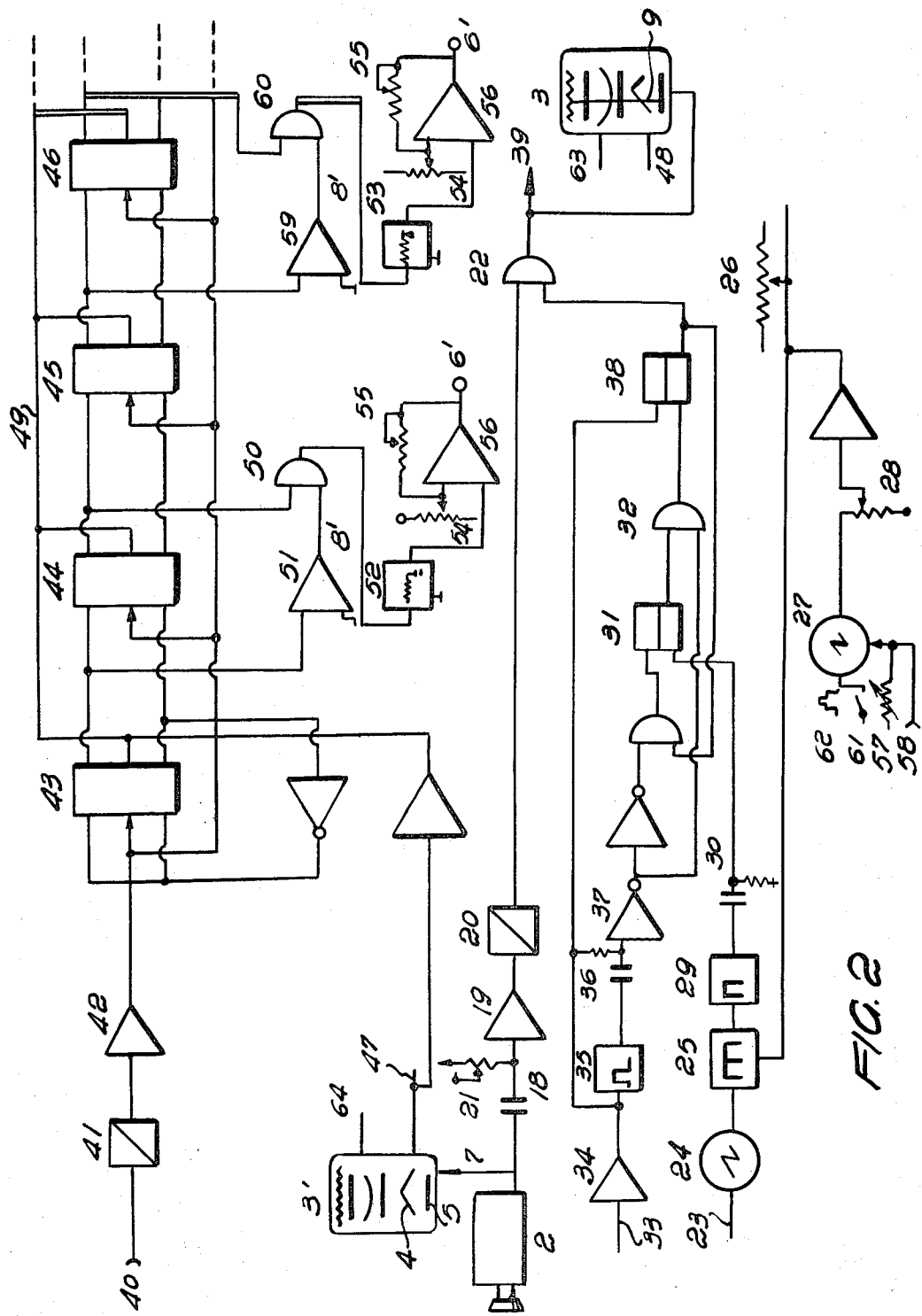

Other objects and many of the attendant advantages of the invention will be readily appreciated as the same becomes better understood by reference to the following detailed description, when considered with the accompanying drawings, wherein FIG. 1 illustrates the basic circuit according to the invention, in a somewhat simplified embodiment of the novel apparatus, aiming at exploring only one curve of a graph; and FIG. 2 shows the electronic circuit, partly in a simplified form, of a second exemplary embodiment of the inventive apparatus, also for practising the inventive method, for the simultaneous exploration of several curves.

In relation with the circuit illustrated in FIG. 1, a graph 1 to be explored is placed in front of a closed-circuit TV camera 2 which is preferably set on one of its sides, i.e., turned 90° about its horizontal axis so that the abscissa axis becomes vertical, that is in a position parallel with respect to the ordinate axis of graph 1.

This arrangement makes possible that the horizontal exploration of the camera intercepts the curve, thus exploring the graph parallel to the axis of ordinates. A TV monitor 3, similarly supported on one side, can also give the correct picture. A curve 4 to be explored as to its image points is accompanied by a straight horizontal reference line 5 forming its abscissa axis or reference line.

Video pulses or signals 7 from camera 2 reach one of the inputs of AND gates 11, 12 which let them pass provided that their other inputs are activated. A signal is obtained from a vertical restoring pulse 17, i.e., from each change of frame which is delayed in a circuit, e.g., a delaying multivibrator 13, so that is is always included in the time within one frame.

The first video pulse 7 therefore opens gate 11, allowing the signal to reach a flip-flop 14. The latter, and a flip-flop 15 are initially turned "high" (to the upper part) due to restoring pulse 17 coming from the vertical synchronizing circuit. Pulses crossing gate 11 turn flip-flop 14 "low" (to the lower part), thus allowing gate 12 to pass pulses coming from video signal 7 and, therefore, turning low flip-flop 15.

At the moment determined by delay multivibrator 13 the first video pulse 7 actuates flip-flop 14, and the second pulse actuates flip-flop 15. The time elapsed from one pulse to another is that in which a scanning line 9 intercepts reference line 5 and curve 4. As this line 9 has been selected for the purpose of extracting the visual information provided by the score, which later will have to be transformed into voltages, it shall be referred to hereinafter as the reading scanning line.

This is of course one of the about 500 or 600 or so horizontal lines in a regular TV camera (monitor, receiver and the like, the number depending on the system being applied). Because of the 90° rotation or turning of the inventive system, as explained before, the reading scanning line appears vertically.

When flip-flop 14 turns low, it activates a gate 8 which is also open since its other input is connected to flip-flop 15 which is high. When the second video pulse 7 arrives, flip-flop 15 turns low and gate 8 interrupts.

Therefore, at the output of gate 8 a one to ten microsecond wide pulse is obtained which, rectified and integrated by an operational amplifier 16, gives at output point 6 a direct-current voltage proportional in its magnitude to the width of the video pulse 7, and therefore, proportional to the distance between reference line 5 and curve 4.

In monitor 3 the location of reading scanning line 9 is shown directly through an OR gate 10. This allows access, through its lower input, as illustrated, to video signal 7 while its upper input conducts the output signal from gate 8. The location of line 9 (or bundle of adjacent lines) is determined by the time lag introduced by multivibrator 13, starting from vertical restoring pulse 17.

Line 9 can explore graph 1, either by modifying gradually the time lag of multivibrator circuit 13 or by keeping this lag constant (and therefore line 9) but gradually moving graph 1 in a horizontal direction by conventional means. In case graph 1 has been drawn on a long strip of paper, this is a recommended procedure.

While the arrangement shown in FIG. 1, as a matter of example, aims at exploring a single curve of a graph, the second embodiment to be described hereunder (and its non-illustrated modification to be described later) are adapted simultaneously to explore several curves, as has been mentioned before.

With regards to the circuit of FIG. 2, a score 1' is reproduced on the screen of one or two monitors, such as illustrated at 3 and 3'. The latter is the regular monitor of the closed-circuit TV chain, and in this apparatus it is used only for framing and focusing purposes. Monitor 3 is a slave monitor connected in this system through AND gate 10 in such a way that image 1' is seen without a gray scale, so that only heavy black lines can be seen. The reading scanning line 9 is also visible on the screen of monitor 3, superposed over the section of the image of score 1' that in that moment is being processed. AND gate 10 operates as explained for FIG. 1. It should be understood that elements 2, 3, 4, 5 and 7 are similar to those described for the first embodiment of the inventive apparatus, and will not be re-introduced for the second embodiment. The video signal is differentiated now in a circuit 18 and amplified by a follower amplifier 19 and then transformed by a Schmitt trigger 20. The threshold of the latter is controlled by a volume control or variable resistor 21. Thus the signal is free from any interference other than the pulses to be analyzed, which pass through an AND gate 22.

In order that pulses corresponding to only one scanning line cross gate 22 the following chain is established: a saw-tooth generator 24 which is synchronized by vertical synchronization 23 connects to a variable-width pulse shaper 25. The pulse width of shaper 25 is voltage controlled by the chain of electronic components: saw-tooth generator 27, adjustable resistor or potentiometer 28, buffer amplifier 63, and a variable resistor 26 or the like, as is described hereinafter in more detail. The use of resistor 26 makes it possible to determine manually a departing position of the exploring line, while generator 27 permits a slow movement of said line. This scanning range of the generator is controlled by an adjustable resistor or control 28.

The pulse already delayed by shaper 25 is shaped into a sharp pulse by a circuit 29 and differentiated by circuit elements 30. This pulse turns low a flip-flop 31, and it will progress through a gate 32 when a pulse arrives, indicating that an entire line has started. In order to obtain this, a horizontal synchronization pulse 33 is amplified by a unit 34, delayed by a circuit 35, differentiated by elements 36, inverted by a unit 37 and transferred to gate 32. The output of the latter turns a flip-flop 38 down. The latter is raised again by the next horizontal synchronizing pulse in order to avoid that the following line, or part of it, goes through its lower part.

Video signal 7 can go to monitor 3 only when a convenient pulse has turned flip-flop 38 down at gate 22. Through connections 39, 40 video signal 7 reaches a Schmitt trigger 41 which equalizes the amplitude of the signal. By means of a follower amplifier 42 the signal is fed to the input of a number of JK-type flip-flops 43, 44, 45, 46 which form a well known shift register. As a matter of example, four are shown but it will be understood that there may be more or less.

As a result of this, the first pulse 7 progresses through flip-flop 43, the second actuates unit 44, the third, unit 45, and so on. At each change of frame of the camera, all flip-flops are reset by a line 49 which is fed by a vertical synchronization pulse 47, amplified by buffer amplifier 63.

The time elapsed between the operation of units 43, 44 is equal to the time necessary for the TV camera to scan the distance between reference line 5 and the first curve drawn on the score. The time lag between the output of units 45, 46 is equal to the time lag between the following reference line and the next curve, and so on. We can thus read more than one curve, and separate the curves without interaction, through a sequential system resembling pulse-width modulation. The pulses coming from flip-flops 43, 44 go to one input of a gate 50 where an inverter amplifier 51 is connected to the second input.

Integrating stages 52, 53, etc. allow to obtain direct-current voltages 6' which should be connected at appropriate control inputs of electronic music synthesizers; these voltages are proportional to each pulse width. In FIG. 2, as a matter of example, two such circuits are only shown, with substantially similar circuit elements. A variable control 54 adjusts zero in each of them, and a control 55 adjusts the gain of an operational amplifier 56, thus adjusting the maximum amplitude. Earlier-described control 26 allows to position the reading line and to scan the graph manually. The graph may be explored either once or repeatedly by means of saw-tooth generator 27 connected through control 28. The amplitude of the saw tooth is controlled by the latter. The frequency of the generator is manually controlled by a variable resistor 57, and it is externally voltage controlled through its input 58. This input could be connected to output 6' of control 56 (again in both integrating stages 52, 53). The scanning speed obtained through this connection is proportional to the drawn curve being read.

Additional marks can be included on the upper part of the graph to indicate the connection and/or route the destination to which the information of the following curve is sent.

After the first curve it is possible to omit the next reference line if the amplifiers and gates of the integrating stages are reconnected so that inputs of gate 50 and of an amplifier 59 are tied to the output of flip-flop 44, and the other input of a gate 60 is tied to the output of flip-flop 45, and so on.

In this way, the system is used with a maximum of efficiency, but programming becomes more complex; since each curve uses the former curve as a reference line, they must be measured point by point while drawing. A single scan is obtained by pushing a button 62 while repetitive scan is obtained through a switch 61, both being associated with generator 27.

Since Schmitt trigger 20 clips off the horizontal and vertical synchronizing pulses of video signal 7, these pulses are obtained from the standard monitor 3' in order to avoid building a synchronization circuit to obtain the synchronization pulses from composite video signal 7'. Horizontal synchronization 64, obtained from monitor 3', is fed to the monitor 3 through line 63, and also to pulse input 33. Similarly, vertical synchronization 47 goes an to input 48 and to vertical pulse input 23.

The process and apparatus according to the invention may also be applied by using a flying-spot scanner instead of a closed-circuit TV camera. This demands only minor modifications and is not illustrated herein but will be readily understood by those skilled in the art. As it is well known, the flying-spot scanner consists of a cathode-ray projection or display tube which, by means of projection optics, casts a non-modulated picture onto a sheet of paper. This image consists of normal scanning lines. The light which is reflected by or goes through the paper is then received by a photo-multiplier tube from which, after being amplified, a video signal is obtained (similar to the video pulses of signals 7 described for both exemplary embodiments). The signal of change of frame or vertical restoring signal (such as pulse or signal 17 described before) is obtained from the vertical synchronization on the projection tube.

The advantage of a flying-spot scanner system lies in the possibility of transferring the graph at a higher speed, avoiding troubles caused by the retention time of vidicon or orthicon-type camera tubes. The disadvantage of having possibly to work in a darkened room may be overcome by using a laser beam with a suitable deflection system instead of the normal cathode-ray type projection tube.

It should be understood of course that the foregoing disclosure relates only to preferred embodiments of the invention and that it is intended to cover all changes and modifications of the examples described, and of the inventive method, which do not constitute departures from the spirit and scope of the invention.

What I claim is:

1. A process for converting multi-channel analog graphs into DC voltages, and also for translating analog drawn scores into electronically generated sound, by the aid of an integrated system, a closed TV circuit, and an electronic music synthesizer operated by voltage control, the process comprising the steps of providing a TV camera and a TV monitor, and rotating the same about 90°, placing a graph, containing at least one variable in at least one curve, before said camera, so that the horizontal deflection of the latter crosses said graph from its bottom to its top, converting said variables into video signals in said camera, so that said signals contain one pulse for each intersection with said graph, including differentiating, gating and subsequently shaping and then counting said pulses, and producing from successive pulses, that represent successive intersections on said graph, output pulses directly proportional to the distance of said variables on said graph, rectifying and integrating said output pulses into DC voltages proportional to each magnitude for a desired coincidence point of different curves on said graph, selecting thus at least one adjacent line, and selecting said lines in each frame, optionally positioning said lines along said frames, by controlling the pulse width of a variable multivibrator, said pulse width determining what position said lines will have on said monitor, directly converting said video signals into electric control signals, including adjusting a low-frequency saw-tooth generator so as to scan slowly at least a part of the whole image field, determining which line one after the other is being selected, synchronizing horizontal and vertical pulses, determining that only said one line is selected at a given time for each frame, displaying said lines on said monitor, superimposing said lines onto an image which shows the outlines of said graph, visually following the entire process of taking voltages from said variables of the curves in real time, aurally following said output pulses, and making corrections in said variables until the desired effect is obtained.

2. An apparatus for converting multi-channel analog graphs into DC voltages, and also for translating analog drawn scores into electronically generated sound, including an integrated system, a closed TV circuit, and an electronic music synthesizer operated by voltage control, comprising, in combination, a TV camera and a TV monitor, both being rotated about 90°, a graph being placed before said camera, said graph containing at least one variable in at least one curve, so that the horizontal deflection of said camera crosses said graph from its bottom to its top, electronic means for converting said variables into video signals in said camera, so that said signals contain one pulse for each intersection with said graph, means for differentiating and gating said pulses, means for shaping and counting the same, means for producing from successive pulses, that represent successive intersections on said graph, output pulses directly proportional to the distance of said variables on said graph, means for rectifying and integrating said output pulses into DC voltages proportional to each magnitude for a desired coincidence point of different curves on said graph, means for selecting at least one adjacent line in each frame, electronic means for directly converting said video signals into electric control signals, means for synchronizing horizontal and vertical pulses, means for selecting only said one line at a given time for each frame, means for displaying said lines on said monitor, and means for superimposing said lines onto an image which shows the outlines of said graph.

* * * * *